United States Patent Office

2,980,687
Patented Apr. 18, 1961

2,980,687

THIADIAZOLE-DICARBOXYLATES

Marvin Carmack, 300D Crowells Road, Bloomington, Ind., and Daniel Shew, 184 Newman St., and Leonard M. Weinstock, 1127 E. 1st St., both of Clifton, N.J.

No Drawing. Filed July 23, 1958, Ser. No. 750,419

2 Claims. (Cl. 260—299)

This invention relates to new organic compounds. More specifically it relates to new heterocyclic compounds wherein the hetero atoms are nitrogen and sulfur. Still more specifically, it is concerned with 1,2,5-thiadiazoles substituted at the 3 and 4 positions with carboxy groups, and with derivatives thereof.

Many heterocyclic organic compounds are known in the scientific literature and have been known for many years. However, prior to this invention, 3,4-disubstituted 1,2,5-thiadiazoles were completely unknown. It is an object of this invention to provide for the first time 1,2,5-thiadiazoles substituted at the 3 and 4 positions of the heterocyclic ring. It is a further object to provide a synthesis of such compounds from 4-nitro-2,1,3-benzothiadiazole. A still further object is the provision of 1,2,5-thiadiazole-3,4-dicarboxylic acid by oxidation of 4-nitro-2,1,3-benzothiadiazole. An additional object is the provision of mono and di-salts of 1,2,5-thiadiazole-3,4-dicarboxylic acid, and of the hydrocarbon esters of said acid. Still another object is the provision of the amides and acid halides derived from the aforementioned dicarboxylic acid. It is yet another object to make available syntheses of such compounds.

1,2,5-thiadiazole-3,4-dicarboxylic acid is a new compound having the following structural formula:

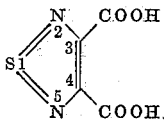

This compound is strongly acidic and very soluble in water and polar organic solvents. When pure it exists as a high melting crystalline solid.

It has been discovered that 1,2,5-thiadiazole-3,4-dicarboxylic acid may be prepared by oxidation of 4-nitro-2,1,3-benzothiadiazole with permanganate under the conditions described below. This process may be pictured structurally as follows:

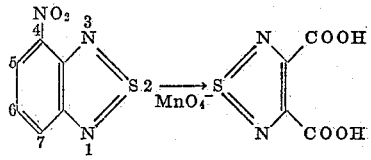

4-nitro-2,1,3-benzothiadiazole is a known compound. According to this invention it has been found that treatment of this substance with an alkali or alkaline earth metal permanganate results in oxidation of the benzothiadiazole to 1,2,5-thiadiazole-3,4-dicarboxylic acid.

It is preferred to employ potassium permanganate as the oxidizing agent although other permanganates such as the sodium or barium compounds may be utilized. The oxidation is normally carried out in an aqueous reaction medium at temperatures between about 40° C. and 75° C., and preferably in the range of 50–70° C. For best results from 6–8 moles of permanganate are employed for every mole of 4-nitro-2,1,3-benzothiadiazole. Six moles are required by the stoichiometry of the reaction and only a slight excess over this theoretical amount has been necessary to obtain satisfactory results. Larger quantities of oxidizing agent may, of course, be employed if desired.

For convenience in conducting the reaction it is preferred to add the permanganate salt to a solution of 4-nitro-2,1,3-benzothiadiazole gradually over a period of one-half to two hours, either in solution or as a solid. The oxidation proceeds rapidly and is ordinarily substantially complete as soon as the addition of oxidizing agent is finished. As will be recognized by those skilled in this art, completion of the reaction may be readily determined by the persistence in the reaction mixture of the characteristic blue-purple permanganate color.

The pH of the reaction medium is important to the successful oxidation of 4-nitro-2,1,3-benzothiadiazole to 1,2,5-thiadiazole-3,4-dicarboxylic acid. For best results, the initial pH of the benzothiadiazole solution should be about 6–7. As the oxidation proceeds the pH will gradually become alkaline until the final pH is about 10. As long as the pH is about neutral or alkaline the desired product is obtained. An acidic permanganate oxidation, however, should be avoided in the process, i.e. during the oxidation the reaction mixture should not become strongly acidic.

It will be realized that 1,2,5-thiadiazole-3,4-dicarboxylic acid is formed in the reaction mixture as a salt, the particular salt depending upon the permanganate salt used as the oxidant. Thus, when potassium permanganate is utilized as the oxidizing agent, the dipotassium salt of 1,2,5-thiadiazole-3,4-dicarboxylic acid is formed in the neutral or alkaline oxidation medium; correspondingly, the sodium salt of the di-acid is produced when sodium permanganate is the oxidizing agent. The free acid and/or other salts may be prepared therefrom as discussed below.

1,2,5-thiadiazole-3,4-dicarboxylic acid and its alkali metal salts are highly water-soluble substances. For this reason we prefer to purify and isolate the acid by way of a water insoluble heavy metal salt, preferably the mono-silver salt. For example, the aqueous solution obtained upon oxidation of 4-nitro-2,1,3-benzothiadiazole may be filtered to remove insolubles and the resulting filtrate, which contains a water soluble alkali metal salt of 1,2,5-thiadiazole-3,4-dicarboxylic acid, made strongly acidic with nitric acid. A water soluble silver salt such as silver nitrate is then added whereupon the highly insoluble mono-silver salt of 1,2,5-thiadiazole-3,4-dicarboxylic acid precipitates from solution in a highly pure form. This latter salt may then be converted to substantially pure free acid by removal of the silver therefrom with an acid such as hydrochloric, hydrobromic, hydriodic acids or hydrogen sulfide.

According to an additional embodiment of this invention, mono and di salts of 1,2,5-thiadiazole-3,4-dicarboxylic acid may be prepared by treating the free acid with a base. In this manner, the ammonium salts, alkali metal salts such as sodium and potassium derivatives, alkaline earth metal salts such as the barium and calcium salts, or heavy metal salts may be obtained. In order to prepare a di-salt an aqueous solution of the free acid is treated with excess base. The mono salts are conveniently prepared by treating an aqueous solution of 1,2,5-thiadiazole-3,4-dicarboxylic acid with a base to a pH of about 3. In synthesizing these salts, we prefer to utilize bases such as ammonium hydroxide, potassium hydroxide, sodium hydroxide and the like. The salts are conveniently isolated by precipitation from the aqueous reaction mixture with acetone. Such salts may be further reacted as discussed below to prepare other useful derivatives of 1,2,5-thiadiazole-3,4-dicarboxylic acid.

A still further embodiment of the invention comprises the esters of 1,2,5-thiadiazole-3,4-dicarboxylic acid, particularly the alkyl esters. The di-lower alkyl esters are obtained by reaction of an alkali metal or ammonium salt of 1,2,5-thiadiazole-3,4-dicarboxylic acid with an alkanol in the presence of a strong acid. It is desirable to carry out the esterification process in the cold, i.e. at temperatures of about 0° to 15° C. although higher reaction temperatures may be used if desired. Thus, lower alkanolic esters such as 3,4-dicarbomethoxy-1,2,5-thiadiazole; 3,4-dicarbethoxy-1,2,5-thiadiazole; 3,4-dicarbopropoxy-1,2,5-thiadiazole and 3,4-dicarbobutoxy-1,2,5-thiadiazole are obtained by suspending an ammonium or alkali metal salt of the free acid in the appropriate lower alkanol saturated with dry hydrogen chloride. The reaction mixture is held in the cold for from 20–50 hours in order to obtain maximum esterification. These lower alkyl esters, which are high-boiling oils may be recovered from the reaction mixture by methods known to one skilled in this art. We prefer to employ the mono-ammonium salt of 1,2,5-thiadiazole-3,4-dicarboxylic acid as starting material for the synthesis of the esters because that salt is highly crystalline and readily purified. However, other salts such as the mono-potassium, the mono-sodium, the di-ammonium and di-potassium salts could also be utilized for this purpose.

Alternatively, the esters may be synthesized in high yield from 1,2,5-thiadiazole-3,4-dicarboxylic acid itself by treating said acid with an alcohol and the like in the presence of a strong acid.

In a still further embodiment of the invention, the mono esters of 1,2,5-thiadiazole-3,4-dicarboxylic acid may be prepared by treating the mono-silver salt with an alkyl iodide, such as methyl or ethyl iodide, in an organic solvent. Benzene, toluene or ether are particularly suitable solvents for this purpose. In this fashion there may be obtained esters such as the mono-methyl, mono-ethyl, mono-propyl and mono-butyl esters of 1,2,5-thiadiazole-3,4-dicarboxylic acid.

In accordance with a still further embodiment of this invention there are provided the amide and acid halide derivatives of 1,2,5-thiadiazole-3,4-dicarboxylic acid. The amides are synthesized by treating an ester, and preferably a lower alkyl ester, of the free acid with ammonia. For example, 3-carboxamido 1,2,5-thiadiazole-4-carboxylic acid is obtained by reaction of a mono lower alkyl ester of 1,2,5-thiadiazole-3,4-dicarboxylic acid with akueous ammonia. The 3,4-diamide is produced on treatment of lower alkyl 1,2,5-thiadiazole-3,4-dicarboxylate with anhydrous ammonia in the cold.

Alternatively, the diamide may be prepared from the di-acid halide, e.g. the di-acid chloride or bromide, by contacting said material with ammonia. The acid halides are produced on treatment of an alkali metal salt of 1,2,5-thiadiazole-3,4-dicarboxylic acid, such as the potassium salt, with a hologenating agent. Halogenating agents such as thionyl chloride or thionyl bromide are particularly suitable for this purpose.

1,2,5-thiadiazole-3,4-dicarboxylic acid is a useful resin curing agent, being particularly useful in the curing of epoxy resins employed for casting, fiber glass lamination and adhesives.

Also certain of the new compounds of this invention, and particularly 1,2,5-thiadiazole-3,4-dicarboxamide, have significant anti-diabetic activity and may be employed as anti-diabetic agents.

The 1,2,5-thiadiazole-3,4-dicarboxylic acid and the several salts, esters, amides, acid halides and like derivatives described herein may be converted one to another as described in more detail in the detailed examples which follow, such inter-conversions and reactions, and the new compounds produced thereby are a part of the instant invention.

EXAMPLE 1

*1,2,5-thiadiazole-3,4-dicarboxylic acid*

25 grams of 4-nitro-2,1,3-benzothiadiazole (0.138 mole) was slurried in 500 ml. of water. The mixture was heated to 60° C. on a steam bath and a solution of 131 grams of potassium permanganate (0.828 mole) in 2600 ml. of water was added thereto over a period of 45 minutes, the temperature being maintained between 65–70° C. Excess permanganate remaining at the end of the addition period was destroyed by the addition of a small amount of ethanol. The manganese dioxide was separated from the hot solution by filtration and washed with 400 ml. of water. The filtrate and washings were combined and the clear, light-yellow solution of the di-potassium salt of 1,2,5-thiadiazole-3,4-dicarboxylic acid was acidified to a pH of about 1 by the addition of 80 ml. of concentrated nitric acid. The acidified solution was treated with a solution of 23.5 grams of silver nitrate in 50 ml. of water and allowed to cool in the ice box. The white, crystallized mono-silver salt of 1,2,5-thiadiazole-3,4-dicarboxylic acid was separated by filtration and washed with 200 ml. of water in small portions. The dried silver salt weighed 30 grams and blackened without melting between 235–255° C.

The silver salt was slurried in 300 ml. of water and hydrogen sulfide gas passed into the mixture until the formation of silver sulfide was complete. The resulting suspension was treated with 5 grams of activated charcoal and filtered by gravity; the precipitated silver sulfide was washed with 100 ml. of warm water. The combined nitrates and washes were evaporated to a moist residue and the last traces of water were removed by drying over phosphorus pentoxide for a few hours. The 1,2,5-thiadiazole-3,4-dicarboxylic acid thus obtained weighed 14.3 grams. The product melted at 174–178° C. with decomposition. Recrystallization from glacial acetic acid raised the melting point to 184° C.

*Analysis.*—Calculated for $C_4H_2N_2SO_4$: C, 27.59; H, 1.15; N, 16.09; S, 18.41. Found: C, 28.09; H, 1.26; N, 16.19; S, 18.16.

On standing the substance absorbs water and is converted to the monohydrate.

*Analysis.*—Calculated for $C_4H_4N_2SO_4$: C, 25.00; H, 2.10. Found: C, 25.04; H, 2.08.

EXAMPLE 2

*Salts of 1,2,5-thiadiazole-3,4-dicarboxylic acid*

A. *Mono-silver salt.*—Addition of a silver nitrate solution to an aqueous solution of 1,2,5-thiadiazole-3,4-dicarboxylic acid precipitated the mono-silver salt of the acid. The product was purified by recrystallization from hot water. It does not melt, but blackens gradually between 235–255° C.

B. *Mono-ammonium salt.*—Ammonium hydroxide was added to an aqueous solution of 1,2,5-thiadiazole-3,4-dicarboxylic acid to a pH of 3. On cooling, some of the salt crystallizes and the remainder is precipitated by the addition of acetone to the filtrate. On recrystallization from water-acetone the mono-ammonium salt is obtained, melting point 253–254° C.

*Analysis.*—Calculated for $C_4H_5N_3O_4S$: C, 25.13; H, 2.64; N, 21.99; S, 16.77. Found: C, 25.65; H, 2.67; N, 21.89; S, 16.53.

C. *Diammonium salt.*—An excess of ammonium hydroxide was added to an aqueous solution of 1,2,5-thiadiazole-3,4-dicarboxylic acid and an equal volume of acetone added to the ammoniacal solution. The precipitated diammonium salt was collected by filtration and dried. The compound was purified by recrystallization from water-acetone, melting point 254–255° C.

*Analysis.*—Calculated for $C_4H_{10}N_4SO_5$: C, 21.24; H, 4.66; N, 24.77; S, 14.08. Found: C, 21.66; H, 4.66; N, 24.87; S, 14.01.

D. *Mono-potassium salt.*—Potassium hydroxide was added to an aqueous solution of 1,2,5-thiadiazole-3,4-dicarboxylic acid to a pH of 3 and an equal portion of acetone was then added. The mono-potassium salt, crystallized, and salt was purified by recrystallization from water-acetone, melting point 293° C.

*Analysis.*—Calculated for $C_4HN_2SO_4K$: C, 22.64; H, 0.48; N, 13.20. Found: C, 22.47; H, 0.31; N, 13.21.

E. *Dipotassium salt.*—The dipotassium salt was prepared and purified in the same manner as the di-ammonium salt using potassium hydroxide in place of ammonium hydroxide. Melting point 310° C.

These salts are useful in purifying the free acid, and as intermediates in the synthesis of esters and acid halides of 1,2,5-thiadiazole-3,4-dicarboxylic acid.

EXAMPLE 3

*1,2,5-thiadiazole-3,4-dicarboxylic acid di-acid chloride*

One gram of mono-potassium-1,2,5-thiadiazole-3,4-dicarboxylate was added to 5 ml. of thionyl chloride. The mixture was boiled under reflux for one hour and the excess solvent was then removed in vacuo. The resulting residue was sublimed at reduced pressure (50°/3 mm.) and 475 mg. of the white crystalline 1,2,5-thiadiazole-3,4-dicarboxylic acid di-acid chloride was obtained. The melting point was 47° C.

*Analysis.*—Calculated for $C_4Cl_2N_2SO_2$: Cl, 33.60; S, 15.19. Found: Cl, 33.52; S, 14.70.

On treatment with ammonia in the cold, this material is converted to 3,4-dicarboxamido-1,2,5-thiadiazole.

EXAMPLE 4

*4-carbomethoxy-1,2,5-thiadiazole-3-carboxylic acid*

Two grams of recrystallized mono-silver-1,2,5-thiadiazole-3,4-dicarboxylate was mixed with 20 ml. of dry benzene and 2.3 grams of distilled methyl iodide, and the resulting mixture stirred for 36 hours. The yellow precipitate of silver iodide was removed by filtration and washed well with ether. The combined filtrate and washes were evaporated under reduced pressure, leaving 4-carbomethoxy-1,2,5-thiadiazole-3-carboxylic acid as a clear light yellow oil which slowly crystallized on standing at 0° C. The solid melted at 74–78° C. Sublimation of this material at 60°/0.1 mm. and then recrystallization of the sublimate from a mixture of ether and petroleum ether raised the melting point to 80–81° C.

*Analysis.*—Calcd. for $C_5H_4N_2SO_4$: C, 31.91; H, 2.14; N, 14.89; S, 17.04. Found: C, 31.70; H, 2.12; N, 14.91; S, 16.77.

EXAMPLE 5

*4-carbomethoxy-1,2,5-thiadiazole-3-carboxylic acid*

A suspension of 8 grams of the mono-silver salt of 1,2,5-thiadiazole-3,4-dicarboxylic acid in a solution of 6 ml. of methyl iodide in 80 ml. of dry ethyl ether was stirred at room temperature in the dark for 43 hours. The resulting solid was removed by filtration and treated with a fresh solution of 5 ml. of methyl iodide in ethyl ether for 76 hours. The yellow precipitate of silver iodide was removed by filtration, and the ether solutions combined. Removal of the ether by distillation in vacuo gave 5 grams of 4-carbomethoxy-1,2,5-thiadiazole-carboxylic acid as a pale yellow viscous oil which slowly solidified on standing.

EXAMPLE 6

*4-carboxamido-1,2,5-thiadiazole-3-carboxylic acid*

1.27 grams of 4-carbomethoxy-1,2,5-thiadiazole-3-carboxylic acid was shaken vigorously with a solution of 2 ml. of concentrated ammonium hydroxide in 5 ml. of water. A light brown solid separated which was removed by filtration. This was crude 1,2,5-thiadiazole-3,4-dicarboxamide. The filtrate was acidified with nitric acid, and the light tan solid which formed was collected by filtration. Recrystallization of this material from 50 ml. of acetone gave 4-carboxamide-1,2,5-thiadiazole-3-carboxylic acid as short colorless prisms, melting point 219–220.5° C.

*Analysis.*—Calculated for $C_4H_3N_3O_3S$: C, 27.75; H, 1.75; N, 24.28; S, 18.53. Found: C, 27.88; H, 2.00; N, 24.15; S, 18.32.

EXAMPLE 7

*4-carbomethoxy-1,2,5-thiadiazole-3-carbonyl chloride*

3.1 grams of 4-carbomethoxy-1,2,5-thiadiazole-3-carboxylic acid was refluxed with 5 ml. of thionyl chloride in 10 ml. of benzene for two hours. At the end of the reflux period, the reaction mixture was cooled, and the benzene and thionyl chloride removed by evaporation in vacuo. The amber liquid residue was distilled, and 4-carbomethoxy-1,2,5-thiadiazole-3-carbonyl chloride obtained as a pale yellow oil boiling point 88–92° C./0.5 mm.

*Analysis.*—Calculated for $C_5H_3N_2O_3SCl$: C, 29.08; H, 1.46; N, 13.56; Cl, 17.17. Found: C, 30.18; H, 1.34; N, 13.51; Cl, 15.71.

EXAMPLE 8

*3,4-dicarbomethoxy-1,2,5-thiadiazole*

An ice-cooled suspension of 2.12 grams of 1,2,5-thiadiazole-3,4-dicarboxylic acid mono-ammonium salt in 25 ml. of dry methanol was saturated with hydrogen chloride gas. The reaction mixture was allowed to stand in the refrigerator for 40 hours, filtered, and the colorless inorganic precipitate washed with methanol. The filtrate was concentrated until the formation of two liquid phases. One phase was removed by extraction of the concentrate with three portions of ether totaling 100 ml. Evaporation of the ether extracts yielded a yellow oil which was distilled at 129°/4 mm. pressure to give 3,4-dicarbomethoxy-1,2,5-thiadiazole as a white viscous liquid which solidified in the cold. $\lambda$ max. 263–264 log $\epsilon$=4.00, $\lambda$ min. 233 log $\epsilon$=3.13.

EXAMPLE 9

*3,4-dicarbomethoxy-1,2,5-thiadiazole*

3.9 grams of the mono-ammonium salt of 1,2,5-thiadiazole-3,4-dicarboxylic acid was suspended in 45 ml. of methanol. The mixture was cooled in ice and saturated with dry hydrogen chloride. It was then held at about 0–5° C. for 46 hours at the end of which time the hydrogen chloride was neutralized by the addition of solid sodium bicarbonate. The resulting white precipitate was removed by filtration and washed with methanol. The combined filtrate and washes were evaporated under vacuum to a yellow oil. Ethyl ether was added to dissolve the oil, and the mixture was decanted from a small water layer. The ether was removed in vacuo, and the oil was distilled at 0.2 mm. Three fractions were obtained over a range of 89–97° C., totaling 3.44 grams. These were allowed to solidify partially at room temperature. Pure 3,4-dicarbomethoxy-1,2,5-thiadiazole was prepared by combining the solid portions of the three fractions and redistilling at 0.1 mm. The product was a colorless viscous liquid, boiling point 84–85° C./0.1 mm.

*Analysis.*—Calcd. for $C_6H_6N_2O_4S$: C, 35.64; H, 2.99; N, 13.85; S, 15.88. Found: C, 36.01; H, 3.03; S, 15.77.

EXAMPLE 10

*1,2,5-thiadiazole-3,4-dicarboxamide*

Anhydrous ammonia gas was passed through a solution of 0.75 gram of 3,4-dicarbomethoxy-1,2,5-thiadiazole in 10 ml. of methanol until the solution was saturated. The reaction mixture was then allowed to cool in the cold for several hours. The colorless crystals which deposited were filtered and washed several times with methanol. Recrystallization of the crystals from hot water yielded substantially pure 1,2,5 - thiadiazole - 3,4 - dicarboxamide, melting point 240° C.

Analysis.—Calcd. for $C_4H_4N_4O_2S$: C, 27.90; H, 2.34; N, 32.54; S, 18.63. Found: C, 27.95; H, 2.34; N, 32.40; S, 17.52.

EXAMPLE 11

1,2,5-thiadiazole-3,4-dicarboxamide 0.504 gram of 4-carbomethoxy-1,2,5-thiadiazole-3-carbonyl chloride was added dropwise to 5 ml. of ice-cold concentrated ammonium hydroxide. 1,2,5-thiadiazole-3,4-dicarboxamide separated as a white, finely crystalline. It was recovered by filtration, washed with methanol and air-dried.

EXAMPLE 12

3,4-dicarbomethoxy-1,2,5-thiadiazole

One gram of 1,2,5-thiadiazole-3,4-dicarboxylic acid was added to 10 ml. of methanol. The resulting mixture was cooled and then saturated with dry hydrogen chloride gas. The mixture was maintained at 0–10° C. for about 30 hours and then the excess acid nuetralized with sodium bircarbonate. The resulting precipitate was removed by filtering and the filtrate concentrated to an oil in vacuo. The oily dimethyl ester of 1,2,5-thiadiazole-3,4-dicarboxylic acid was extracted in a small volume of ethyl ether and the ether was then removed by concentration and the oil distilled at a pressure of 0.2 mm. The material boiling in the temperature range of 90–97° C. was collected and further redistilled as described in Example 9 to give substantially pure 3,4-dicarbomethoxy-1,2,5-thiadiazole.

When this process is carried out employing ethanol as the solvent in place of methanol, there is obtained 3,4-dicarboethoxy-1,2,5-thiadiazole.

These esters, and other lower alkyl esters which are prepared from the free acid in the same manner, are useful intermediates in the synthesis of the diamide as set forth in Example 10.

EXAMPLE 13

3,4-dicyano-1,2,5-thiadiazole

A solution of 0.96 gram of 3,4-dicarboxamido-1,2,5-thiadiazole in 6 ml. of phosphorus oxychloride was refluxed for about 40 minutes. The mixture was then chilled and poured onto 250 ml. of crushed ice. The mixture was stirred until the ice had melted and then extracted with three 50 ml. portions of ether. The ether extracts were combined, washed with 20 ml. of sodium carbonate solution, washed with water and then dried over sodium sulfate. The ether was removed in vacuo leaving a crystalline residue of 3,4-dicyano-1,2,5-thiadiazole, melting point 47–49° C.

This material is active against free-living nematodes such as *Panagrellus redivivus* and against soil fungi such as Fusarium.

Any departure from the above description which conforms to the present invention is intended to be included within the scope of the claims.

What is claimed is:

1. The process which comprises treating 4-nitro-2,1,3-benzothiadiazole with an alkali metal permanganate in a reaction medium having an initial pH of at least about 6 thereby producing an alkali metal salt of 1,2,5-thiadiazole-3,4-dicarboxylic acid.

2. The process which comprises treating 4-nitro-2,1,3-benzothiadiazole with potassium permanganate in an aqueous reaction medium having an initial pH of at least about 6, thereby producing the potassium salt of 1,2,5-thiadiazole-3,4-dicarboxylic acid.

References Cited in the file of this patent

UNITED STATES PATENTS 2,733,245    Ainsworth _____ Jan. 31, 1956

OTHER REFERENCES

Khaletskii et al.: Chem. Abstracts, vol. 52, col. 4605–6 (1958).

UNITED STATES PATENT OFFICE
CERTIFICATION OF CORRECTION

Patent No. 2,980,687 April 18, 1961

Marvin Carmack et al.

It is hereby certified that error appears in the above numbered patent requiring correction and that the said Letters Patent should read as corrected below.

In the grant, lines 1 to 3, for "Marvin Carmack, of Bloomington, Indiana, and Daniel Shew, and Leonard M. Weinstock, both of Clifton, New Jersey," read -- Marvin Carmack of Bloomington, Indiana, and Daniel Shew, of Metuchen, and Leonard M. Weinstock, of Highland Park, New Jersey, --; in the heading to the printed specification, lines 3 to 5, for "Marvin Carmack, 300D Crowells Road, Bloomington, Ind., and Daniel Shew, 184, Newman St., and Leonard M. Weinstock, 1127 E. 1st St., both of Clifton, N. J." read -- Marvin Carmack, 1127 E. 1st St., Bloomington, Ind., and Daniel Shew, 184 Newman St., Metuchen, and Leonard M. Weinstock, 300-D Crowells Road, Highland Park, N. J. --.

Signed and sealed this 3rd day of October 1961.

(SEAL)
Attest:

ERNEST W. SWIDER
Attesting Officer

DAVID L. LADD
Commissioner of Patents